(12) United States Patent
Yan

(10) Patent No.: US 8,517,405 B2
(45) Date of Patent: Aug. 27, 2013

(54) HUMAN POWERED VEHICLE WITH TWO RECIPROCAL PEDALS

(76) Inventor: Hui Yan, Marietta, GA (US)

( * ) Notice: Subject to any disclaimer, the term of this patent is extended or adjusted under 35 U.S.C. 154(b) by 682 days.

(21) Appl. No.: 12/231,366

(22) Filed: Sep. 2, 2008

(65) Prior Publication Data

US 2009/0066053 A1 Mar. 12, 2009

Related U.S. Application Data

(60) Provisional application No. 60/993,184, filed on Sep. 10, 2007.

(51) Int. Cl.
*B62M 1/04* (2006.01)
*F16H 21/12* (2006.01)

(52) U.S. Cl.
USPC .............................. 280/252; 74/41

(58) Field of Classification Search
USPC ............................ 280/252; 74/41
See application file for complete search history.

(56) References Cited

U.S. PATENT DOCUMENTS

| | | | |
|---|---|---|---|
| 3,375,023 A | 3/1968 | Cox | |
| 3,877,724 A | 4/1975 | Chase | |
| 3,954,282 A | 5/1976 | Hege | |
| 5,716,069 A | 2/1998 | Bezerra | |
| 5,860,329 A * | 1/1999 | Day | 74/594.1 |
| 6,152,471 A * | 11/2000 | Kang et al. | 280/261 |
| 6,209,900 B1 * | 4/2001 | Yoshizawa | 280/252 |
| 6,402,173 B1 | 6/2002 | Chiu | |
| 6,648,353 B1 | 11/2003 | Cabal | |
| 6,648,355 B2 | 11/2003 | Ridenhour | |
| 6,716,141 B2 | 4/2004 | Bhoopathy | |
| 6,916,031 B1 * | 7/2005 | Serdiuk | 280/237 |
| 2007/0085297 A1 * | 4/2007 | Cruft | 280/252 |

* cited by examiner

*Primary Examiner* — Tony H. Winner
*Assistant Examiner* — Jacob Knutson
(74) *Attorney, Agent, or Firm* — Wang Law Firm, Inc.; Li K. Wang; Stephen Hsu

(57) ABSTRACT

A reciprocal pedal drive mechanism for human powered vehicles. The drive motion on each of the two pedals is efficiently converted to two motions, one for pedal recovery and the other for driving the vehicle forward.

15 Claims, 5 Drawing Sheets

HUMAN POWERED VEHICLE WITH TWO RECIPROCAL PEDALS

RELATED APPLICATIONS

This application claims priority of U.S. Provisional No. 60/993,184, entitled "Scooters with Simultaneously Pedal Recovery System," filed on Sep. 10, 2007.

FIELD OF THE INVENTION

The invention relates to reciprocal pedal drive mechanisms generally to the field of sports, recreation, toys, and particularly relates to user-propelled vehicles, such as two-wheel or three-wheel scooter.

BACKGROUND OF THE INVENTION

Bicycles and kick scooters are popular human powered vehicles and have been used by most people.

Some pedal actuate scooters have been developed as an attempt to provide substitute for regular scooters, but almost all of them are either hard to operate or clumsy, and are not acceptable to most users.

The basic arrangement of a forward sprocket wheel driven by rotating pedal cranks and coupled by an endless roller chain to a rear sprocket wheel mounted concentrically with the hub of the rear wheel of the bicycle or tricycle combines the advantages of simplicity and low friction to provide an inexpensive and efficient drive mechanism. But this conventional design has an inherent drawback, however. Rotary pedal cranks do not provide a uniformly effective conversion of the substantially linear driving force exerted by the rider into drive torque. At the top and bottom of pedal travel, drive torque is minimal. This makes the regular bicycle difficult to ride while the bicycle is slowly on uphill or muddy road even with the speed change systems. Also it is difficulty to ride bicycle with the user standing on the pedals.

Other drive mechanisms for pedaled scooters or bicycles have been used. One of the pedaled scooter in U.S. Pat. No. 6,716,141 B2 has a pair of pedals recovered by springs. U.S. Pat. No. 6,648,355 B2 is about a step driven bicycle. U.S. Pat. No. 6,648,353 B1 issued to P. Cabal describes an upright step-cycle with elliptical motion pedaling. Other pedaled drive mechanisms include U.S. Pat. No. 6,402,173 B1, U.S. Pat. No. 3,954,282, U.S. Pat. No. 3,877,724, and U.S. Pat. No. 3,375,023.

SUMMARY OF THE INVENTION

According to the invention, a scooter includes a frame, pedals adapted to support a user, wheels, steering hand bar, and a geartrain mounted to the wheels. The geartrain is adapted to receive a downward force from the pedals, translate a portion of the downward force into a rotational force acting to rotate the wheels in one direction only, and provide an upward return force for the pedals.

Objects, features, and advantages of various embodiments of the invention include:

(1) Improved apparatuses and methods for propelling a human powered vehicle, such as a scooter; and (2) Push down one pedal will simultaneous raise the other pedal and drive the wheel(s), and (3) Each crank arm rotates less than 180° angle.

DETAILED DESCRIPTION OF SPECIFIC EMBODIMENTS

The present invention related to user-propelled vehicle such as a scooter, skateboard, or boat, which utilizes power generated by movement of a user supported by a platform while keeping both feet on the platform without touching the ground. While the embodiments shown here relate to scooters, one skilled in the art will recognize the applicability of the invention to other toys, vehicles, and/or platforms that can support a user.

Figure 1:
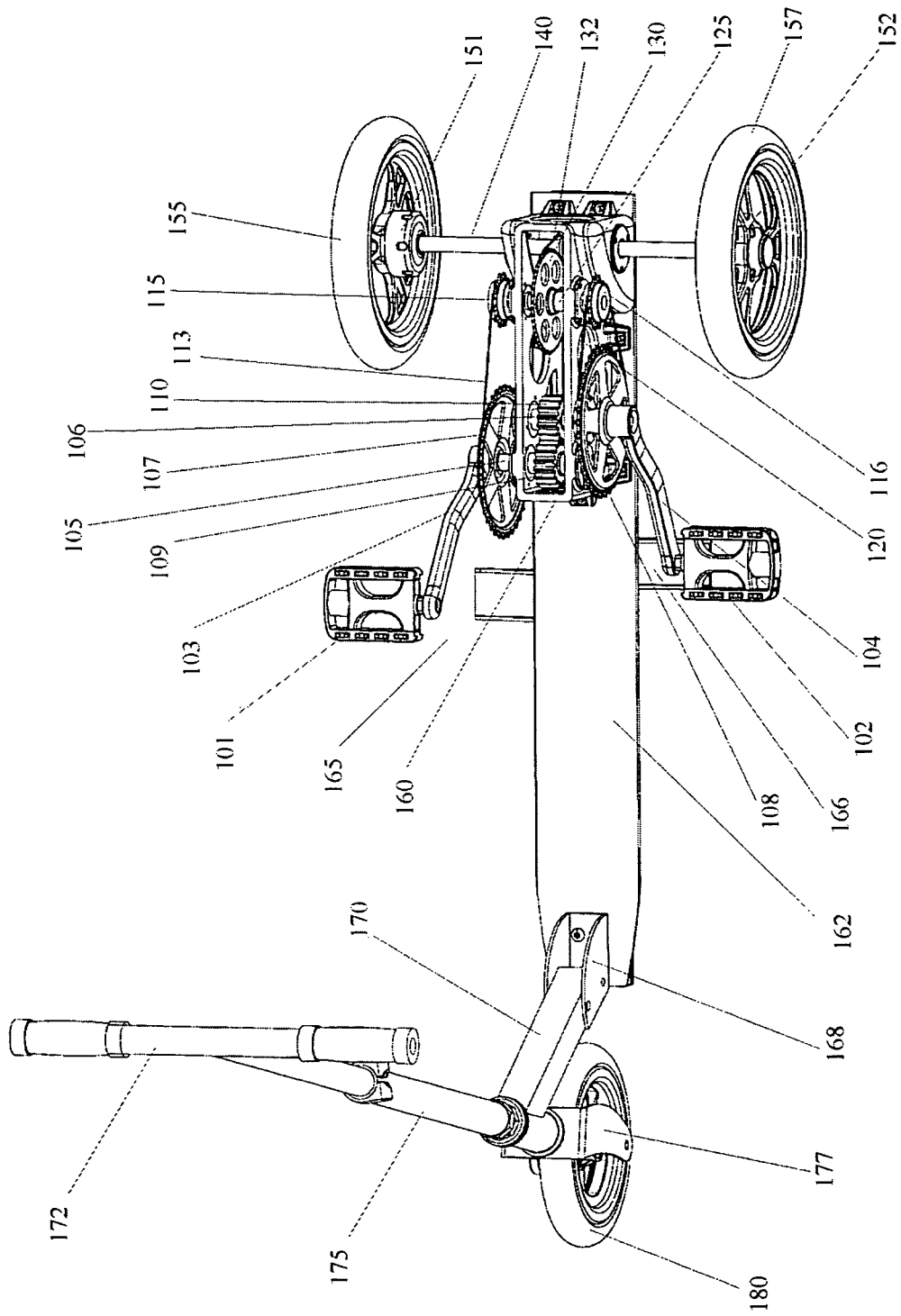
FIG. 1 is a perspective view of a three-wheel scooter.
Figure 2:
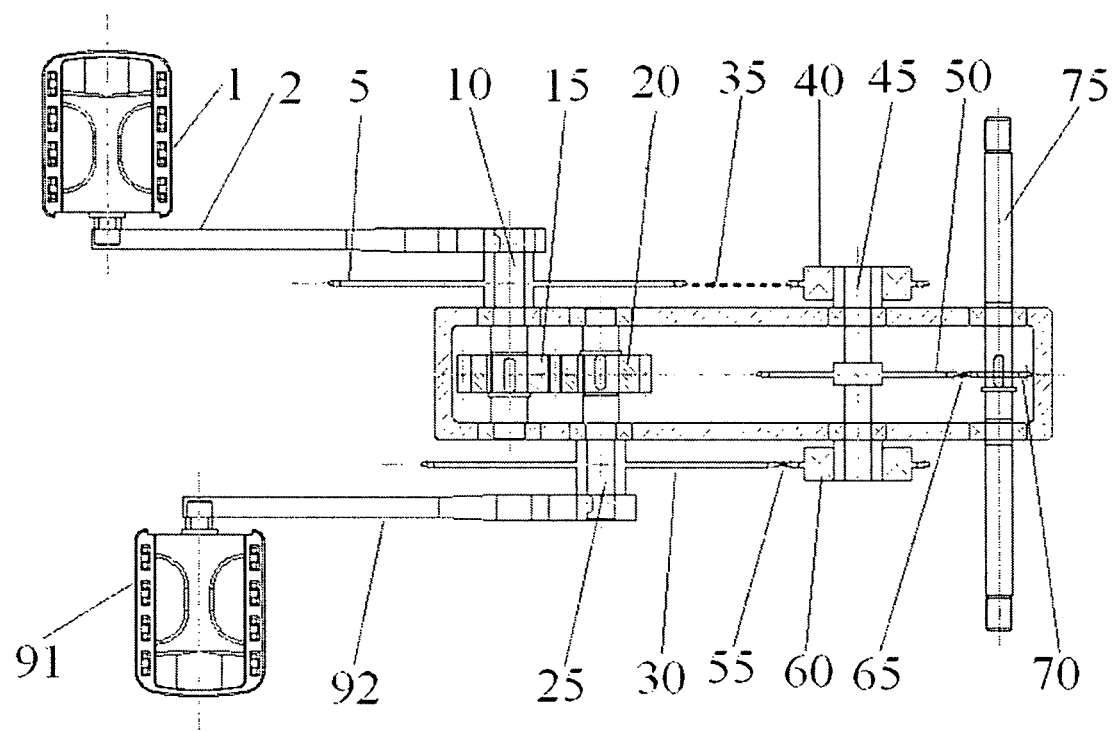
FIG. 2 is an overhead sectional view of the gear based pedal return system transmission assembly for the apparatus shown in FIG. 1.

FIG. 1 is a perspective view of a first embodiment of an apparatus in accordance with the invention. FIG. 2 is a perspective view of transmission system of the FIG. 1. The apparatus includes a handle bar 172, an upright handle 175, a front wheel fork 177, a connector 170, a front wheel 180, two parallel upward walls 168, a deck 162, two opposing pedal rest platforms 165 and 166, a pair of rear wheels 155 and 157, and a driving system (FIG. 2). The driving system is enclosed by an enclosure 160.

The apparatus shown in FIG. 1 and FIG. 2 is a pedaled scooter propelled by driving two pedals 101 and 102 upward and downward. Each of pedals 101 and 102 is adapted to receive a portion of a user's body weight when a user's foot is placed on each of pedals 101 and 102. Each of pedals 101 and 102 is also adapted to move between an initial position and a depressed position. The lowest position pedal 101 or 102 can reach is limited by pedal recess platforms 165 and 166. The pedaled scooter also includes a geartrain or transmission assembly oriented towards the rear portion of the pedaled scooter that translates downward force on the pedals 101 and 102 to a rotational force on the rear wheel. A geartrain can include, but is not limited to, gear-type drives, chain-type drives, belt-type drives, hydraulic-type drives, or other combined drives that translate a downward force into a rotational force. When pedal 101 is pressed down, crank 103 will turn chain wheel 107 and gear 109 via the crank shaft 105. Gear 109 will engage with gear 110 and turn the shaft 106 in the opposite direction, therefore raise pedal 102 via crank 104. Chain wheel 107 will also rotate and pull chain 113 to rotate the fly wheel 115. The fly wheel 115 further rotates shaft 125 via one way clutch 121 inside the fly wheel 115. Shaft 125 will further turn chain wheel 130, pull chain 132, and rotate chain wheel 135 and axle 140. The rotation of axle 140 will turn the wheels 155 and 157 via the one way clutches 151 and 152 respectively. Meanwhile, pushing down pedal 101 will make chain wheel 107 and chain wheel 108 to rotate in different direction. But one way clutch 122 in the fly wheel 116 will prevent shaft 125 to engage with the rotation of the fly wheel 116. In general, push down pedal 101 will rotate both wheels 155 and 157, and also raise pedal 102 simultaneously.

When pedal 102 is pressed down, both wheels 155 and 157 will be rotated, also pedal 101 will be raised. Each of crank shafts 103 and 104 will be rotated within 180° angle. And each of crank shafts 103 and 104 will be rotated by same angle at opposite direction. There is also a one-way clutch or overrun clutch in each of the rear wheels to allow the scooter to coast freely and to turn smoothly.

Press each of pedals 101 and 102 will rotate the second shaft 125 in the same direction. Here we call the first shaft converting both pedals' motions to one direction rotation the first unidirectional shaft. Therefore the second shaft 125 is the first unidirectional shaft in this embodiment. The first unidirectional shaft can be used directly as driven wheel shaft or there can be one or multiple shafts for changing speed ration or rotation direction purpose.

Figure 3:
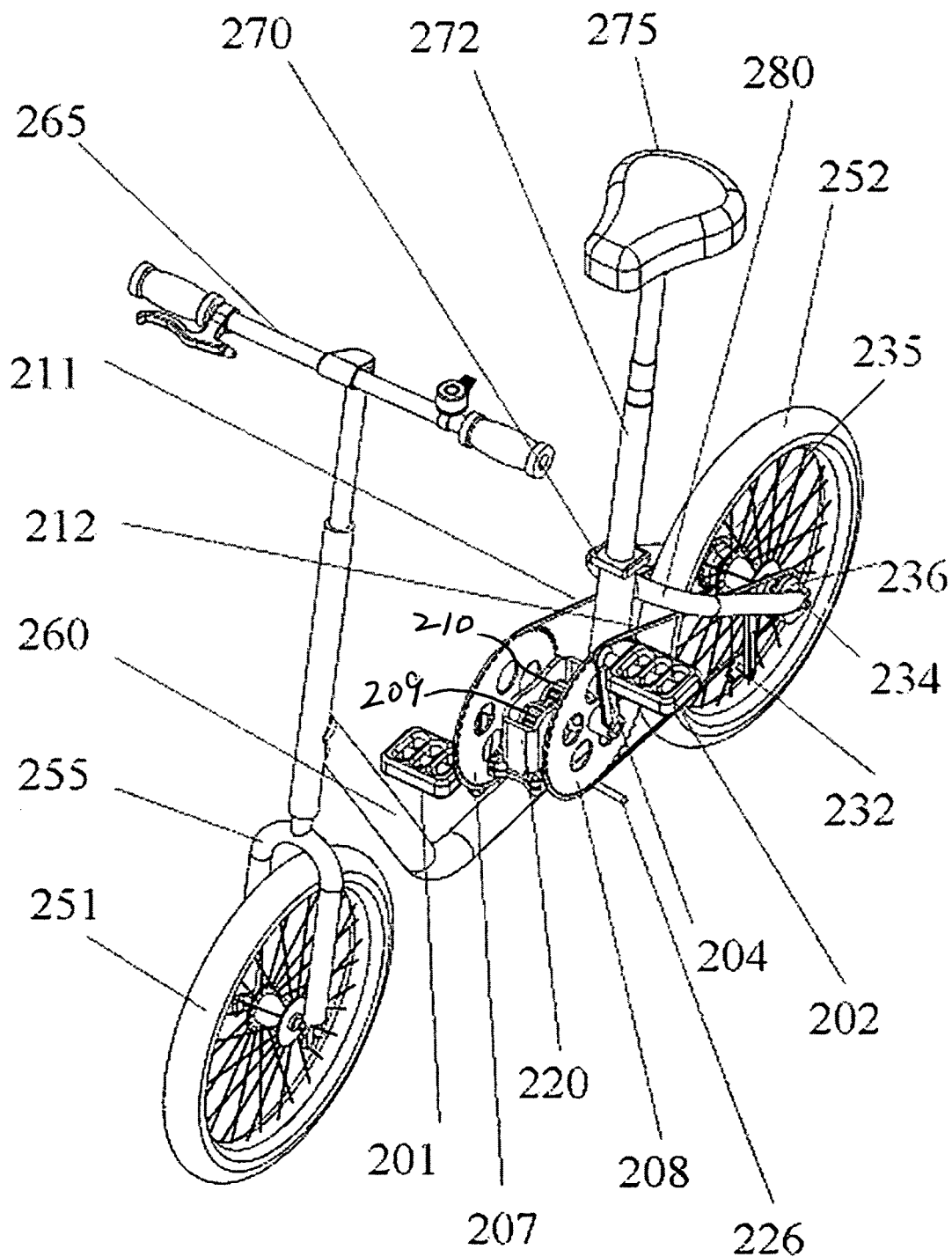
FIG. 3 is a perspective view of a bike scooter.
Figure 4:
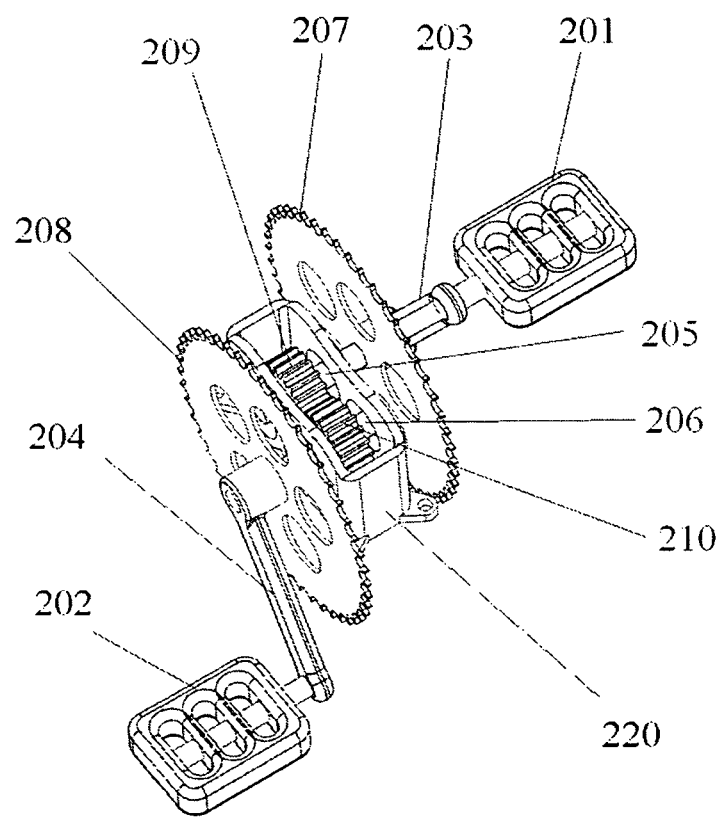
FIG. 4 is an overhead sectional view of the gear based pedal return system transmission assembly for the apparatus shown in FIG. 3

FIG. 3 and FIG. 4 are a perspective view of a second embodiment of an apparatus in accordance with the invention. The apparatus shown is a pedaled bike scooter that is propelled by driving two pedals 201 and 202 upward and downward. Each pedals 201 and 202 is adapted to receive a portion of a user's body weight or the push force when a user's foot is placed on each pedals 201 and 202. Each pedals 201 and 202 is also adapted to move between an initial position and a depressed position. The pedaled bike scooter also includes a geartrain or transmission assembly oriented towards the rear portion of the pedaled bike scooter that translates downward force on the pedals 201 and 202 to a rotational force on the rear wheel. A geartrain can include, but is not limited to, gear-type drives, chain-type drives, cable-type drives, band-type drives, hydraulic-type drives, or other combined drives that translate a downward force into a rotational force and at the same time recovery the other pedal. When pedal 201 is pressed down, crank 203 will rotate chain wheel 207 and gear 209 via the crank shaft 205. Gear 209 will engage with gear 210 and turn the shaft 206 in the opposite direction, therefore raise pedal 202 via crank 204. Chain wheel 207 will also rotate and pull chain 211 to rotate the fly wheel 235. The fly wheel 235 further rotates rear wheel 252. Meanwhile, pushing down pedal 201 will make chain wheel 207 to rotate in the same direction and chain wheel 208 to rotate in different direction. But one way, clutch in the fly wheel 236 will prevent the rear wheel to engage with the rotation of the chain wheel 208. In general, pushing down pedal 201 will rotate rear wheels 252, and also raise pedal 202 simultaneously.

When pedal 202 is pressed down, crank 204 will rotate chain wheel 208 and gear 210 via the crank shaft 206. Gear 210 will engage with gear 209 and turn the shaft 205 in the opposite direction, therefore raise pedal 201 via crank 203. Chain wheel 208 will also rotate and pull chain 212 to rotate the fly wheel 236. The fly wheel 236 further rotates rear wheel 252. Meanwhile, pushing down pedal 202 will make chain wheel 208 to rotate in the same direction and chain wheel 207 to rotate in different direction. But one way clutch in the fly wheel 235 will prevent the rear wheel to engage with the rotation of the fly wheel 235 or chain wheel 207. In general, push down pedal 202 will rotate rear wheels 252, and also raise pedal 201 simultaneously.

Press each pedals 201 and 202 will rotate the rear wheel shaft 234 in the same direction. Here we call the first shaft converting both pedals' motions to one direction rotation the first unidirectional shaft. Therefore the rear wheel shaft 234 is the first unidirectional shaft in this embodiment.

Each crank shaft 203 and 204 will be rotated within 180° angle.

Figure 5:
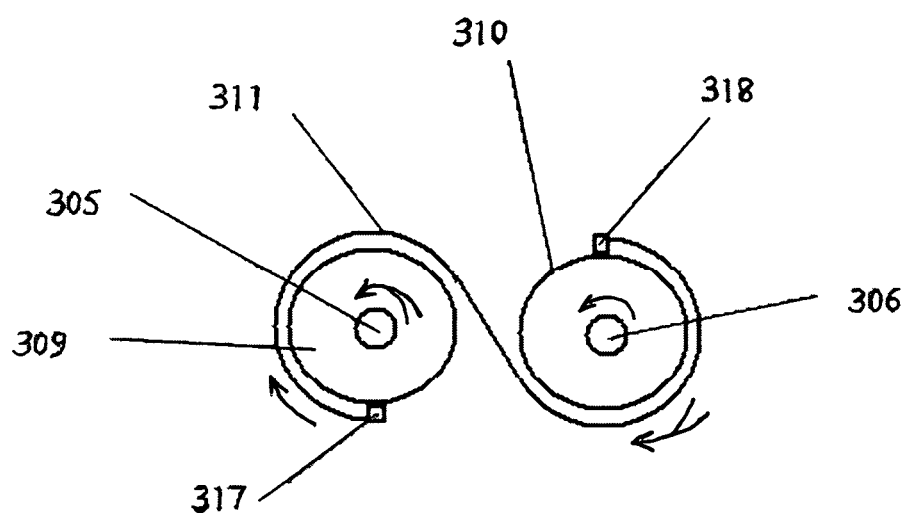
FIG. 5 is a simple illustration side view of a chain, belt, cable, or other flexible tension member based pedal return system.

FIG. 5 shows the gear based pedal recovery system in FIG. 1-4 can also be replaced by chain, cable, band, or other flexible tension members based type recovery system. The gears then will be replaced by the wheels with the flexible tension member reversely mounted between two wheels to make the two wheels rotate in opposite direction. Flexible tension member 311 is partly circled on wheel 309 and wheel 310. Flexible tension member 311 can be chain, belt, cable, or other flexible tension materials. Both ends of the flexible tension member 311 are fixed on the two wheels 309 and 310 by bolts 317 and 317. Wheel 309 is fixed on crank shaft 305, and wheel 310 is fixed on crank shaft 306. When pedal on the crank shaft 305 is pushed down, the rotation of crank shaft 305 will move wheel 309 at the same rotation speed and pull the flexible tension member 311, and further rotate wheel 310 to make the crank shaft 306 to rotate in opposite direction of the crank shaft 305. Therefore, press down the pedal on crank shaft 305 will lift the pedal on crank shaft 306. Similarly, when pedal on crank shaft 306 is pushed down, the crank shaft 305 will be rotated in opposite direction and return the pedal on the crank shaft 305 upward. The arrows in FIG. 5 show the related rotations of the wheels when each pedal is pushed down.

The invention I claim is:

1. A motion transfer system, for transferring reciprocal motion to rotary motion, comprising:
   crank recovery means with a pair of gears mounted on two parallel shafts, one of the gears one each respective shaft, and two cranks, one of the cranks mounted on each respective shaft, whereby motion of either crank in either direction causes motion of other crank in an opposite direction; and
   driving means with a rotary member on each respective shaft of the crank recovery means, each rotary member engaging one fly wheel mounted on a unidirectional shaft to transfer reciprocal motion from the crank recovery means to unidirectional rotation of the unidirectional shaft,
   wherein the two gears of the crank recovery means engage each other and rotate in opposite direction.

2. The motion transfer mechanism of claim 1, wherein each rotary member in the driving means includes connecting means, the connecting means connecting the rotary members to the fly wheels on the first unidirectional shaft.

3. The motion transfer mechanism of claim 1, wherein each fly wheel comprises one one-way clutch to allow the two cranks to move in opposite directions without causing the two fly wheels mounted on the unidirectional shaft to rotate in opposite directions.

4. The motion transfer device of claim 1 further comprising connecting means for connecting the driving means to the fly wheels on the unidirectional shaft.

5. The motion transfer device of claim 4, wherein the connecting means further comprises a chain.

6. A motion transfer device, for transferring reciprocal motion to rotary motion, comprising:
   an enclosure;
   a first crank shaft with a first gear mounted inside the enclosure;
   a first crank mounted on the first crank shaft;
   a second crank shaft with a second gear mounted inside the enclosure, the second crank shaft being substantially parallel to the first crank shaft and the second gear engaging the first gear;
   a second crank mounted on the second crank shaft;
   a unidirectional shaft; and
   a connecting mechanism for connecting either the first crank shaft or the second crank shaft to the unidirectional shaft.

7. The motion transfer device of claim 6, further comprising a first chain wheel and a second chain wheel, the first chain wheel mounted on the first crank shaft and the second chain wheel mounted on the second crank shaft.

8. The motion transfer device of claim 6, wherein said first crank and said second crank rotate in opposite directions.

9. The motion transfer device of claim 6, wherein the unidirectional shaft further comprises a one-way clutch.

10. The motion transfer device of claim 6, wherein the connecting mechanism further comprises a chair.

11. A human powered vehicle comprising:
   a deck;
   an upright handle, with a top end and a bottom end, mounted on the deck;
   a handlebar mounted on the top end of the upright handle;
   a front wheel mounted on the bottom end of the upright handle;
   a rear axle mounted on the deck;
   a pair of rear wheels mounted on the rear axle;
   a driving system, for driving the rear axle, mounted on the deck,
   where in the driving system further comprising:
      an enclosure;
      a first crank shaft, with a first end and a second end, disposed inside the enclosure with the first end of the first crank shaft extending outside the enclosure;
      a first crank mounted on the first end of the first crank shaft;
      a first gear mounted inside the enclosure and on the first crank shaft;
      a second crank shaft, with a first end and a second end, disposed inside the enclosure with the second end of the second crank shaft extending outside the enclosure, the second crank shaft being substantially parallel to the first crank shaft;
      a second gear mounted inside the enclosure and on the second crank shaft, the second gear engaging the first gear;
      a second crank mounted on the second end of the second crank shaft;
      a first unidirectional shaft, with a first end and a second end, mounted inside the enclosure, the first end and the second end of the first unidirectional shaft extending outside of the enclosure;
      a first driving element for connecting the first crank shaft to the first unidirectional shaft;
      a second driving element for connecting the second crank shaft to the first unidirectional shaft,
   wherein the first gear and the second gear rotate in opposite direction.

12. The human powered vehicle of claim 11, further comprising a plurality of pedal rest platforms mounted on the deck.

13. The human powered vehicle of claim 11, wherein the driving mechanism further comprises a one-way clutch embedded inside the unidirectional shaft.

14. The human powered vehicle of claim 11, further comprising a pair of one-way clutches, each clutch embedded inside each rear wheel.

15. The human powered vehicle of claim 11, further comprising a pair of pedals, each pedal mounted on the deck.

* * * * *